May 2, 1950      J. O. GRIERSON      2,505,958
SWINGING POWER SAW
Filed July 19, 1946      2 Sheets-Sheet 2
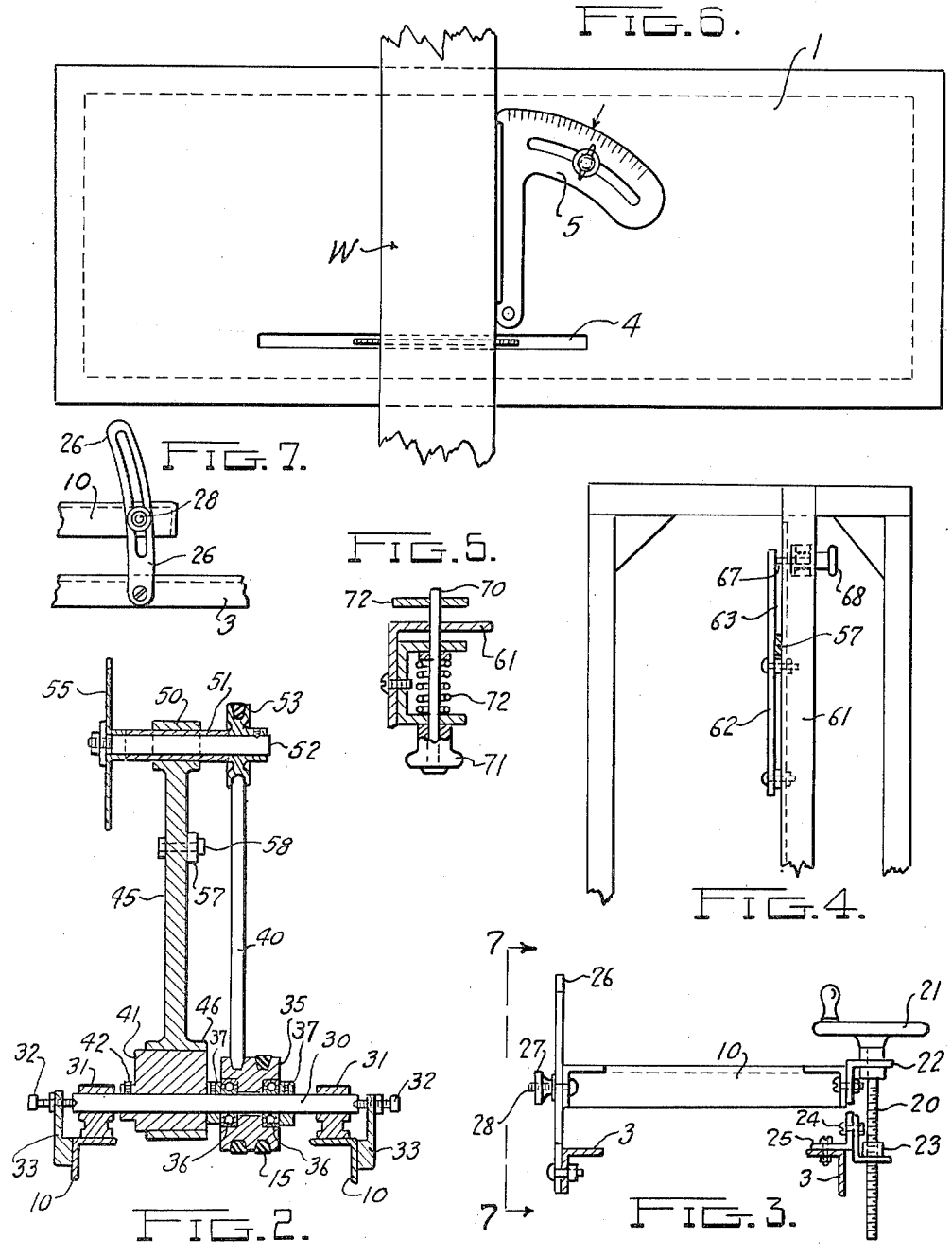
INVENTOR.
John O. Grierson
BY
Barnes, Kisselle, Laughlin & Raisr
ATTORNEYS Patented May 2, 1950

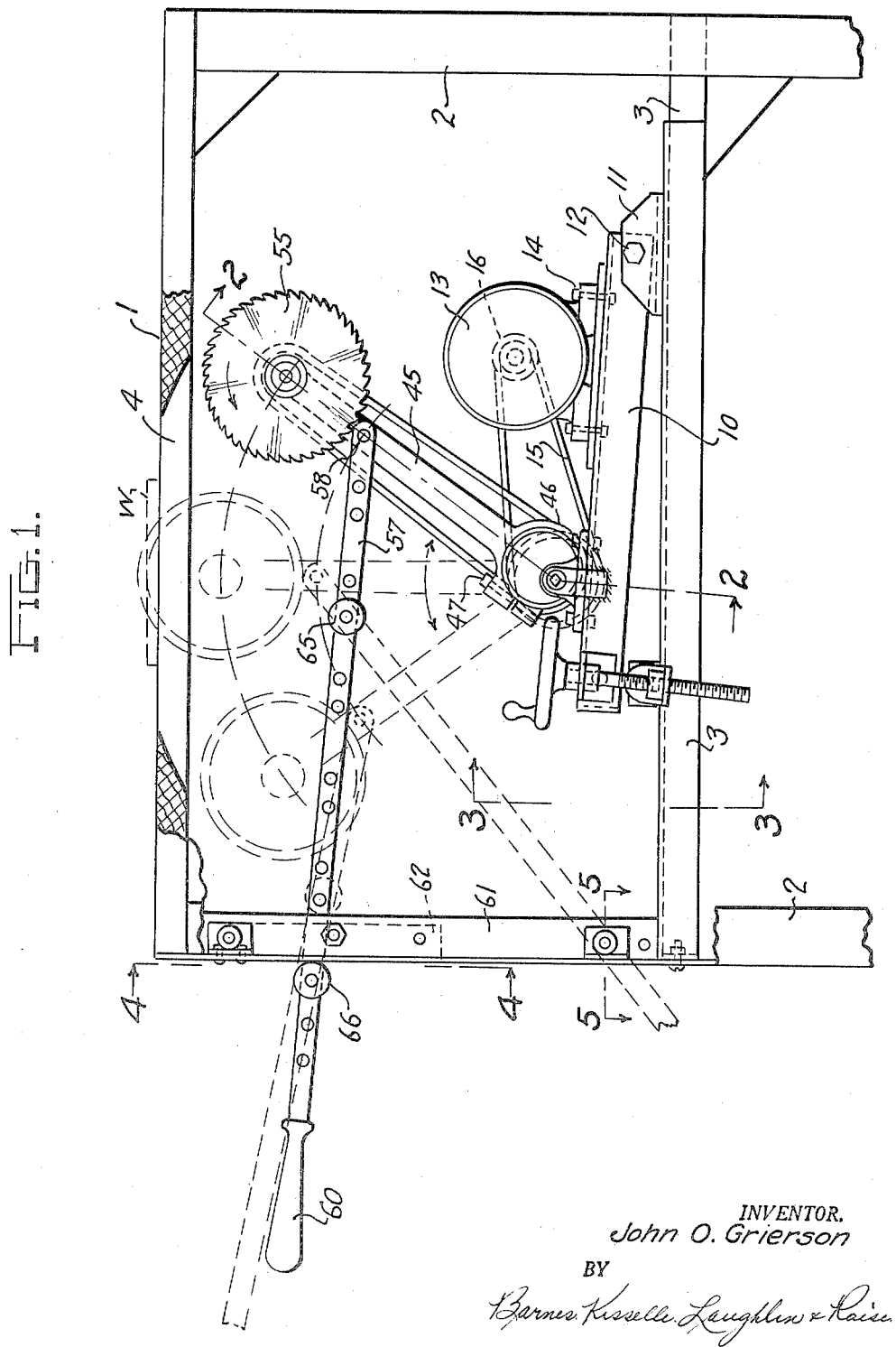

2,505,958

UNITED STATES PATENT OFFICE 2,505,958

SWINGING POWER SAW

John O. Grierson, Ypsilanti, Mich.

Application July 19, 1946, Serial No. 684,691

3 Claims. (Cl. 143—46)

This invention relates to a swinging power saw for use in conjunction with a work table or bench which is suitably slotted or otherwise formed to accommodate the saw blade.

More particularly, the invention is directed to improvements in an apparatus which embodies a rotary disc type saw which is mounted for movement, preferably about an axis, so that the saw, while rotating, may be caused to traverse a work piece. One of the objects of the invention is to provide an improved arrangement for driving the disc saw so that the driving means, which is preferably in the form of a belt, can be appropriately adjusted as to tightness without, in any way, interfering with the pivotal mounting of the saw. Another object of the invention is to provide an apparatus which embodies a swinging disc type saw which can be mounted as a unit underneath the working surface of a table or bench. Other objects of the invention will become apparent as the following detailed description is considered.

The accompanying drawings show one form of apparatus for carrying out the invention and in these drawings:

Fig. 1 is a side elevational view of the sawing apparatus illustrated, the same mounted on a work bench and showing parts cut away and parts in section.

Fig. 2 is a sectional view taken substantially on line 2—2 of Fig. 1, showing the means for mounting and driving the disc saw.

Fig. 3 is a sectional view taken substantially on line 3—3 of Fig. 1 showing the adjustable mounting for the saw.

Fig. 4 is a view looking in the direction of line 4—4 of Fig. 1 illustrating the means for oscillating or rocking the saw.

Fig. 5 is an enlarged sectional detail taken on line 5—5 of Fig. 1 and illustrating a locking means for the swinging saw.

Fig. 6 is a top plan view of a work table.

Fig. 7 is a detail view taken along the line 7—7 of Fig. 3.

As will be seen by reference to Fig. 1, there is a work table having an upper surface or working surface member 1 provided with suitable legs 2 and with cross bracing 3. The top of the table is suitably slotted as at 4 (Fig. 6), and is adapted to receive the work piece W, illustrated as in the form of a board. The table is preferably equipped with a suitable protractor device 5 for positioning the board to thus determine the angle of the cut. The table, in Fig. 6, is not shown with any appreciable width, but this, of course, is variable.

There is a suitable frame 10 provided with brackets 11 which are adapted to be secured to the cross framing 3, and the frame of the device is pivotally mounted to the brackets 11 as at 12. Mounted on this frame is an electric motor 13, the mounting being by means of bolts 14. A driving belt 15 operates over the pulley 16 of the motor.

The frame 10 carries, adjacent one corner, a screw 20 provided with an operating hand wheel 21, the screw being journalled in a bracket mounted on the frame 10, as shown at 22. A nut 23 is carried by a bracket which is pivotally mounted as at 24, the mounting being connected to the frame 3 by another bracket 25. The nut 23 receives the screw 20. On the opposite corner is a slotted arm 26 which is pivotally mounted to a frame member 3 and a thumb nut 27 is mounted on a screw 28 which, in turn, is connected to the frame 10 and extends through the slot in the member 26. It will be seen that by turning the hand wheel the frame 11 is adjusted pivotally about the bolts 12 to thus raise and lower the saw, as will presently be seen. The adjustment is made by first loosening the nut 27, and following the adjustment, the nut 27 is tightened to stabilize the frame 10 in its adjusted position.

As will be seen by reference to Fig. 2, there is a cross shaft 30 carried by the frame 10 in suitable supports 31 and this shaft may be adjusted axially by the manipulation of end screws 32 mounted in brackets 33. Rotatably mounted on the shaft 30 is a double pulley 35 and the belt 15 operates in one of the grooves of this pulley. The type of belts shown herein are the well-known V-belts. The pulley 35 is preferably mounted on the shaft 30 by means of anti-friction bearings 36 and it is held axially positioned by collars 37 mounted on the shaft 30 as by means of set screws as indicated. Another belt 40 operates over the other groove of the pulley.

A carrier member 41 in the form of an eccentric is mounted on the shaft 30 and it may be set in position by a set screw 42. This eccentric carrier member is preferably circular on its exterior surface. The swinging arm for the saw is shown at 45 and it has a base portion 46 which fits over the carrier 41 and which is clamped thereto by means of a clamping bolt 47.

The opposite end of the swinging arm 45 has a sleeve portion 50 adapted to carry a bearing 51 in which is rotatably mounted a shaft 52. Mounted on this shaft 52 for the rotation of the shaft is a pulley 53 over which the belt 40 functions. Also, mounted on the shaft and advantageously on the opposite side of the sleeve 50 is the disc saw blade 55.

For operating the swinging arm there is a rod or link 57 which is connected to the arm 45 as by means of a bolt 58 and this arm is provided with a suitable handle 60. A guide member 61 (Fig. 4), has a cooperating guide element 62 which forms a slot 63 through which the link 57 passes. Mounted on the rod 57 are stop members 65 and 66 designed to abut the guide 61—62 to limit the movements of the rod 57 and thereby the rocking movements of the arm 45. These abutments may be adjustably mounted on the rod 57 by means of the several apertures shown in the rod. The opening 63 is closed at one end therof as by means of a spring pressed plunger 67, which can be retracted by a thumb piece 68 so that the rod member 57 may be removed from or placed into the guide slot as desired. There is also preferably a second spring pressed plunger 70 which can be retracted by a thumb piece 71 against its spring 72 and which plunger functions preferably with respect to the support 61 and a cooperating bracket 72 (Fig. 5).

In the operation of the device, as a swing saw, reference may be made to Fig. 1. When the motor is set into operation the disc saw blade 55 is driven through the belt 15 and the belt 40. The work piece may be placed on the work table and then the operator may grasp the handle 60 and oscillate the arm 45 about the axis of the rod 30. This swings the saw blade through the arc illustrated in Fig. 1 and the blade cuts through the work piece. The stop 65 limits the swing of the blade in one direction and the stop 66 limits the swing of the blade in the opposite direction. The saw blade projects through the slot of the work table and the extent of projection is obtained by adjusting the sub-frame 10 by the elevating screw 20. Thus, if a thicker work piece is encountered the frame 10 is adjusted to elevate the saw. The apparatus may be used in this connection for cross cut operations as indicated in Fig. 6. The arm 45 and thereby the disc-saw blade may be fixed in a position where the saw projects through the slot 4. This may be done as shown by the dotted lines in Fig. 1, by withdrawing the rod 57 from its guide slot 63 and entering the same between the guide member 61 and bracket 72 (Fig. 5) and by passing the spring pressed bolt 70 through an appropriate aperture in the rod 57. In the position illustrated by dotted lines in Fig. 1, the arm 45 will thus be held substantially in a vertical position. In this position the work may be fed to the saw and the device may be used in this adjusted position for ripping operations or, for that matter, for other operations as the operator desires.

The eccentric mounting 41 provides for the adjustment of the tightness of the belt 40. To make such an adjustment the clamping bolt 47 is relieved and then the set screw 42 is loosened and the eccentric mounting 41 is then rotatably adjusted on the shaft 30. This raises or lowers the arm 45 relative to the shaft 30. When a proper adjustment is attained the set screw 41 and the clamping screw 47 are again tightened. The motor mounting as accomplished by the bolts 14 may provide for the adjustment of the motor to adjust the tightness of the belt 15 in the usual and known manner.

I claim:

1. A sawing apparatus for use with a work supporting table comprising, a rocker shaft mounted below the table, an eccentric bearing member adjustably mounted on the rocker shaft, an arm journalled at one end on the eccentric member, a disc saw blade journalled in the arm at the other end of the arm, means for rocking the arm about the bearing member to cause the saw blade to traverse a path with a portion thereof projecting above the table to engage the work on the table, a double pulley journalled on the rocker shaft, a pulley for the saw blade, a driving belt for operating the double pulley, a second belt running over the double pulley and the pulley of the saw blade, said eccentric member being rotatably adjustable relative to the rocker shaft to vary the tightness of the second belt without substantially affecting the first named belt.

2. A sawing apparatus for use with a work supporting table comprising, a frame, means pivotally mounting the frame under the table, a driving motor carried by the frame, a rocker shaft mounted on the frame, a double pulley journalled on the rocker shaft, a belt driven by the motor and operating over the double pulley to drive the same, an eccentric bearing member adjustably mounted on the rocker shaft, an arm journalled on the eccentric member at one end, a disc saw blade journalled on the arm at its other end and having a pulley, a second belt operating over the double pulley and the pulley for the saw blade, means for oscillating the arm about the eccentric bearing member to cause the saw blade to traverse a path with the saw projecting above the table to engage the work thereon, said eccentric member being rotatably adjustable on the rocker shaft to vary the tightness of the second belt, and means for adjusting the frame about its pivotal mounting to vary the extent of projection of the saw blade above the surface of the table.

3. A sawing apparatus for use with a work supporting table comprising, a frame, means pivotally mounting the frame under the table, a driving motor carried by the frame, a rocker shaft mounted on the frame, a double pulley journalled on the rocker shaft, a belt driven by the motor and operating over the double pulley to drive the same, an eccentric bearing member adjustably mounted on the rocker shaft, an arm journalled at one end on the eccentric member, a disc saw blade journalled on the other end of the arm and having a pulley, a second belt operating over the double pulley and the pulley for the saw blade, means for oscillating the arm about the eccentric bearing member to cause the saw blade to traverse a path with the saw projecting above the table to engage the work thereon, said eccentric member being rotatably adjustable on the rocker shaft to vary the tightness of the second belt, means for adjusting the frame about its axis to vary the extent of projection of the saw blade above the surface of the table, said table having a slot through which the saw blade extends, and means for adjusting the rocker shaft axially to adjust the position of the saw blade relative to the table.

JOHN O. GRIERSON.

REFERENCES CITED

The following references are of record in the file of this patent:

UNITED STATES PATENTS

| Number | Name | Date |
|---|---|---|
| 306,560 | Van de Water | Oct. 14, 1884 |
| 567,436 | Zigler | Sept. 8, 1896 |
| 629,516 | Manning | July 25, 1899 |
| 1,364,356 | De Koning | Jan. 4, 1921 |
| 1,586,494 | Walker | May 25, 1926 |
| 2,091,647 | Nicholson | Aug. 31, 1937 |
| 2,202,425 | Marsilius | May 28, 1940 |